May 12, 1925.

J. E. SEARS, JR., ET AL 1,537,622

METHOD OF FORMING SLIP MEASURING GAUGES

Filed Nov. 22, 1919      3 Sheets-Sheet 1

INVENTORS
J.E.Sears Jr. A.J.C.Brookes
BY *H. R. Kerslake*
ATTORNEY

May 12, 1925. 1,537,622

J. E. SEARS, JR., ET AL

METHOD OF FORMING SLIP MEASURING GAUGES

Filed Nov. 22, 1919 3 Sheets-Sheet 2

INVENTORS
J.E.Sears Jr. A.J.C.Brookes,
BY H.R.Kerslake
ATTORNEY

May 12, 1925.

J. E. SEARS, JR., ET AL 1,537,622

METHOD OF FORMING SLIP MEASURING GAUGES

Filed Nov. 22, 1919      3 Sheets-Sheet 3

INVENTORS
J. E. Sears Jr. & A. J. C. Brookes,
BY H. R. Kerslake
ATTORNEY

Patented May 12, 1925.

1,537,622

UNITED STATES PATENT OFFICE.

JOHN EDWARD SEARS, JR., AND ARTHUR JOHN CHARLES BROOKES, OF TEDDINGTON, ENGLAND; SAID SEARS ASSIGNOR TO SAID BROOKES.

METHOD OF FORMING SLIP-MEASURING GAUGES.

Application filed November 22, 1919. Serial No. 339,915.

*To all whom it may concern:*

Be it known that we, JOHN EDWARD SEARS, Junior, and ARTHUR JOHN CHARLES BROOKES, both subjects of the King of Great Britain and Ireland, and both residing at the National Physical Laboratory, Teddington, in the county of Middlesex, England, have invented certain new and useful Improved Methods of Forming Slip-Measuring Gauges, of which the following is a specification.

This invention relates to the production of slip measuring gauges, by which is meant length measuring slips or plates principally intended as check gauges for testing wholly or in part the accuracy of other gauges or work.

Such gauges in order properly to fulfill their functions must be extremely accurate, both as to measuring length and as to parallelism, the required degree of accuracy being usually of the order of about 1/100,000th of their nominal length, and as the nominal lengths of such gauges are usually anything from 1/100th of an inch to 4 inches it will be seen that their accurate production by methods ordinarily adopted for similar devices involves enormous difficulty in practice, even with highly skilled labour.

The object of the present invention is to enable such slip gauges to be accurately produced even by the use of semi-skilled labour, an added advantage of the invention being that a plurality of such gauges automatically generated of exactly equal size is produced simultaneously by the method adopted.

The invention consists in a method of producing slip gauges which consists in lapping or abrading a number of gauges simultaneously and interchanging the position of such gauges between successive lappings.

The invention also consists in the herein described method of effecting the interchange.

The invention also consists in a method of producing slip gauges which consists in forming a chuck with a number of as nearly as possible co-planar facets or platforms thereon, placing the gauges with surfaces already approximately plane upon the facets of the chuck, with the plane surfaces in contact with these facets, then lapping the exposed surfaces of the said gauges simultaneously upon or by means of a flat lapping plate or block, and interchanging the gauges between successive lappings.

The invention also consists in a method of producing slip gauges as above referred to, in which the exposed surfaces of the gauges are simultaneously lapped in successive operations, the gauges being interchanged according to certain definite rules between successive lappings.

The invention also consists in apparatus for use in the production of slip gauges comprising a chuck with a number of as nearly as possible co-planar facets or platforms thereon, means being provided if necessary for retaining the gauges upon the chuck during the lapping operation.

The invention still further comprises other details and arrangements hereinafter described or indicated.

The accompanying drawings illustrate three convenient forms of apparatus in accordance with the invention.

In carrying our invention into effect in one convenient manner, we employ a lapping chuck which may be formed from a rectangular or other suitable shaped block $a$ of metal or other suitable material, and upon one face of this block we form a plurality of facets or platforms $b$ projecting slightly above the general surface of the block, and all formed as nearly as possible co-planar in any suitable manner. A number of gauge blanks of the same nominal size or thickness and each having one face approximately plane are placed upon the facets with their plane surfaces adjacent thereto, and are all simultaneously lapped or ground by rubbing them upon a flat metal surface previously charged with a more or less finely ground abrasive, such lapping operations being well understood, and therefore requiring no further description.

After the lapping operation the gauges will be truly flat upon one side at least but may be of unequal thickness, yet while grouped together upon the chuck the surfaces on the exposed side of all the gauges will be in one geometrical plane and the surfaces on the other sides of the gauges in a second geometrical plane, such planes, however, being at a greater or smaller inclination to one another. Some or all of the gauges are now interchanged and turned end for end upon a definite plan, having regard to the mean thicknesses, and the whole again lapped simultaneously.

Preferably the whole of the gauges are at the same time turned over and the previously lapped faces brought into contact with the facets of the chuck, so that at the second lapping the opposite faces of the gauges are dealt with.

Figure 1:
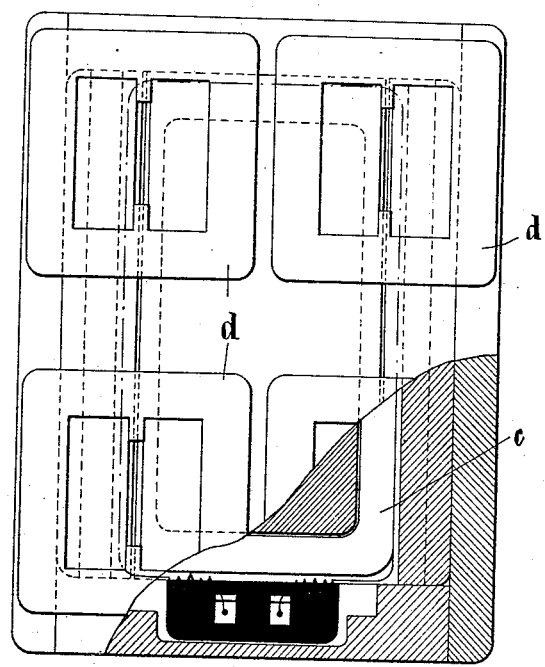
Figures 1, 2 and 3 are respectively a plan, transverse section and longitudinal section of one form of apparatus.
Figure 2:
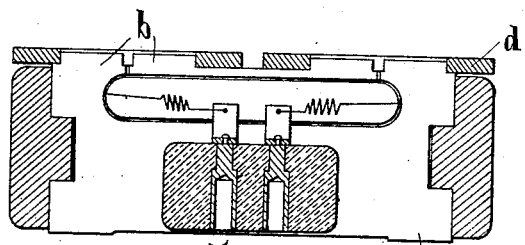
Figure 3:
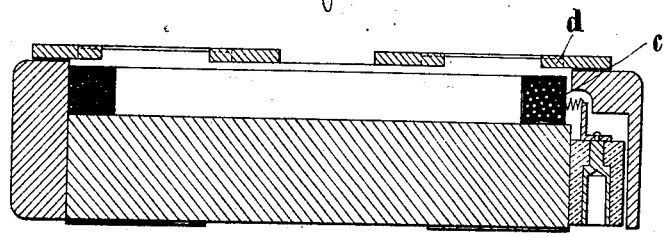
Figure 4:
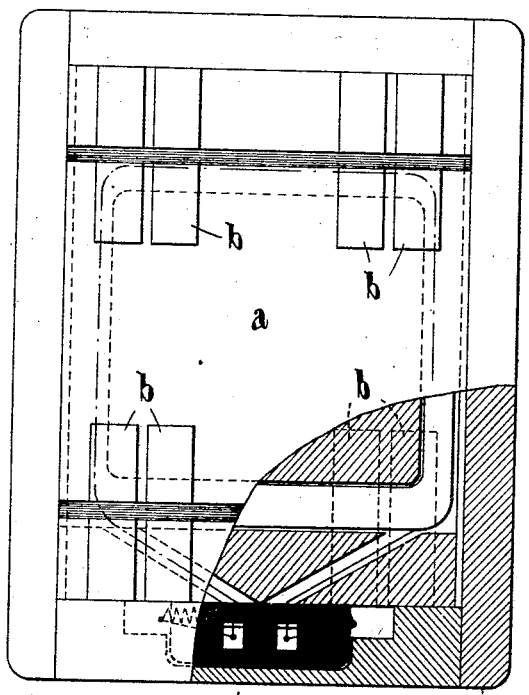
Figures 4, 5 and 6 are similar views of a second form.
Figure 5:
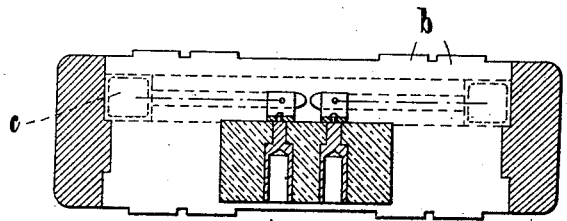
Figure 6:
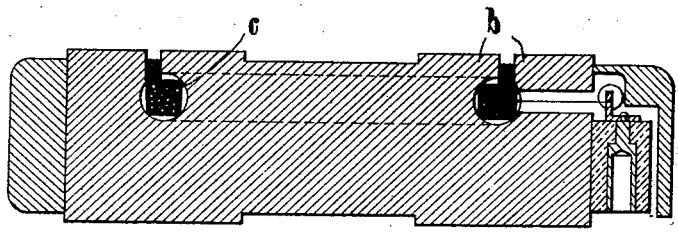

In most cases it will probably be found that after the first lapping the slip-gauges and the facets will "wring" together on account of their plane surfaces, but should any additional means be necessary to retain the slips in position during the lapping, this may be done by providing for magnetic adhesion, produced for example by the coils $c$ and/or by means of a guard or guards $d$ (Figures 1 to 3) surrounding the slips and projecting above the general surface of the chuck facets but below the surfaces of the slips to be lapped.

One method of effecting the necessary interchange between successive lappings may be illustrated by the following tables, it being assumed that there are eight gauges represented respectively by the letters A, B, C, D, while the thickness of the slips are denoted by the conjunction of the letters with the numerals. Thus at the end of the first lapping operation the varying thicknesses of gauge slips resulting from the mutual inclination of the two geometrical planes above mentioned may be indicated as follows:—

```
    1 A 2           3 A 4
    1 B 2           3 B 4
    1 C 2           3 C 4
    1 D 2           3 D 4
``` where the thickness at the left hand end of the third gauge in the first column is denoted by C+1, and that of the right hand end of the first gauge in the second column by A+4 and so on, it being understood that the letters A, B, C, D, and the numerals 1, 2, 3, 4, both represent successively increasing thicknesses. Thereupon the gauges will be turned over and re-grouped and certain of them at the same time turned end for end as illustrated by the following table:—

```
    1 A 2           3 A 4
    4 D 3           2 D 1
    1 C 2           3 C 4
    4 B 3           2 B 1
```

It will now be seen that the mean thickness of the pair of gauges at any corner of the table is the same for all four corners and also for either end of the pair—thus taking for example the first pair in the first column the mean thickness at the left hand end is represented by $$\tfrac{1}{2}\{(A+1)+(D+4)\} = 5/2 + \frac{A+D}{2}$$

and at the right hand is represented by $$\tfrac{1}{2}\{(A+2)+(D+3)\} = 5/2 + \frac{A+D}{2}.$$

Further, taking any other pair, say the last, we have the mean thickness at either end $$= 5/2 + \frac{B+C}{2}.$$

And since A and D were the extremes in the original configuration and B and C the intermediates, it follows that $A+D=B+C$, and we thus have equality of mean thickness throughout all four pairs after the rearrangement. Thereupon the second lapping operation is carried out and continued until the exposed surfaces of the gauges are again reduced into a single geometrical plane. If during this operation equal quantities of material are removed from the pairs of gauges at each corner of the chuck, it follows that all the gauges will now be of the same thickness and their opposite surfaces parallel. If necessary or desirable, further interchanges with further lappings may be effected, though in general it will probably be found that one interchange with two lapping operations will be sufficient to secure parallelism and equality of all the slips.

We are thus enabled to produce simultaneously a group of, say, eight gauges, which after the interchange and succeeding lapping will be all truly parallel and will all be of an equal thickness, and this fact facilitates making the gauges to the thickness required within extremely fine limits of accuracy. This is effected for example by "wringing" all the gauges together and measuring across the group of gauges. Thus for instance, with an ordinary micrometer by which two inches nominal can be measured to within 1/10,000th of an inch, eight ¼ inch slip gauges can be measured and each made to within one 80,000th of an inch, or an eight times closer approximation than would be possible if each gauge were measured individually by the same micrometer.

Figure 7:
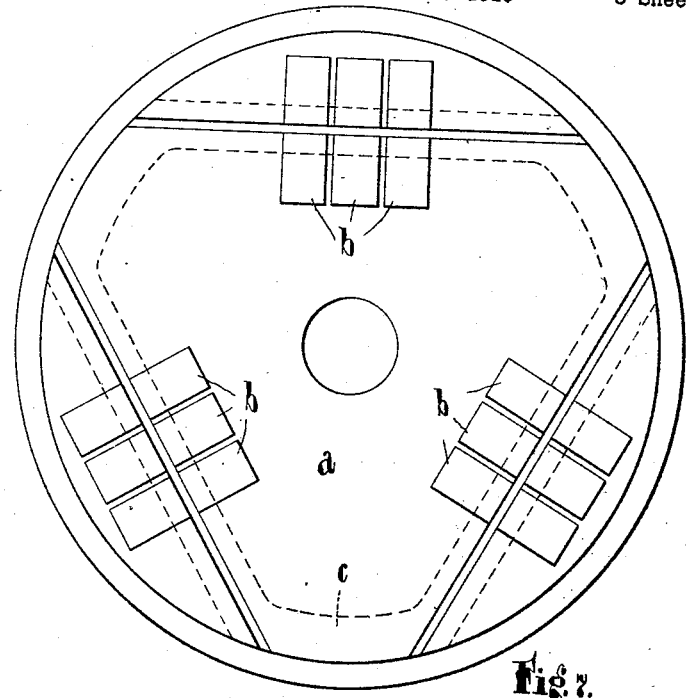
Figures 7 and 8 are front elevation and side elevation of a third form.
Figure 8:
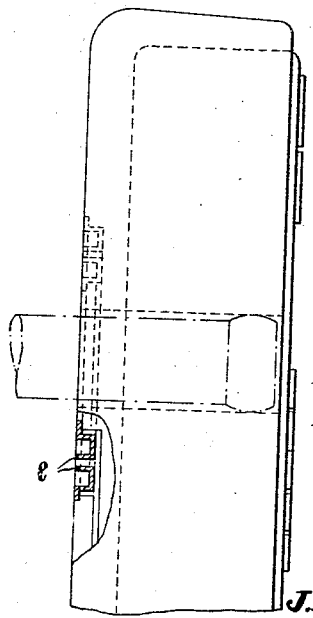

Figures 7 and 8 show one convenient form of chuck that may be employed for mechanical lapping, the chuck being rendered magnetic by current led to the slip rings $e$ and thence to the coil $c$.

It is to be understood that the foregoing details are given by way of example only as the important feature of the invention is the formation of a number of gauges simultaneously by the use of certain definite procedure so devised as to ensure the automatic attainment of exact parallelism and equality, by which means extremely high accuracy of sizes is at the same time secured. Furthermore, we adopt any suitable or known lapping devices and any convenient means for retaining the gauges in position during the lapping operations, while we may vary the number of gauges that are to be produced simultaneously and the method according to which the gauges are interchanged depending upon any particular practical requirements that may have to be fulfilled.

Having now described our invention, what we claim as new and desire to secure by Letters Patent is:—

1. A method of producing slip gauges which consists in lapping simultaneously eight single gauges symmetrically arranged in pairs and held against movement during lapping upon an independent lapping chuck and interchanging the position of such gauges between successive lappings.

2. A method of producing slip gauges which consists in lapping simultaneously eight gauges symmetrically arranged in pairs and held against movement during lapping on an independent lapping chuck, then interchanging the position of such gauges so that the mean thicknesses of the right hand side will equal the mean thicknesses of the left hand side and the mean thicknesses of the ends will also be equal, and then again lapping the gauges.

3. A method of producing slip gauges which consists in forming eight gauges each with a plane surface, arranging said gauges in pairs with the plane surfaces upon the facets of a lapping chuck which are coplanar or as nearly so as possible, holding said gauges against movement during lapping subjecting the other surfaces simultaneously to successive lapping operations and interchanging the positions of said gauges between successive lappings.

4. A method of producing slip gauges which consists in forming eight gauges each with a plane surface, arranging said gauges in pairs with the plane surfaces upon the facets of a lapping chuck which are coplanar or as nearly so as possible, subjecting the other surfaces simultaneously to successive lapping operations and interchanging the positions of said gauges between successive lappings in such a manner that the mean thickness of any one pair of gauges before each lapping operation is made exactly equal to the mean thickness of any other pair of gauges.

5. A method of producing slip gauges which consists in forming eight gauges each with a plane surface, arranging said gauges geometrically in pairs upon the facets of a lapping chuck with their plane faces coplanar or as nearly so as possible, holding said gauges against movement during lapping, subjecting the exposed surfaces simultaneously to a lapping operation so that the two sets of surfaces will each lie in a geometrical plane, interchanging in position certain of the gauges and reversing them end for end so that the mean thickness of any one pair of gauges is made equal to the mean thickness of any other pair and subjecting the gauges to a further lapping operation which will reduce all the gauges to a uniform thickness so that all will be formed with exactly parallel opposite faces separated by an exactly equal dimension.

In testimony whereof we have signed our names to this specification.

JOHN EDWARD SEARS, Jr.
ARTHUR JOHN CHARLES BROOKES.